United States Patent Office 3,244,697
Patented Apr. 5, 1966

3,244,697
DIETHYLENE GLYCOL ESTERS OF BIS(DIALKYL-ENIMINO)PHOSPHINE OXIDES
Ray C. Christena, Levittown, and Edward Broderick, Perkasie, Pa., assignors to Thiokol Chemical Corporation, Bristol, Pa., a corporation of Delaware
No Drawing. Filed Feb. 5, 1962, Ser. No. 171,260
2 Claims. (Cl. 260—239)

The present invention relates to novel tetrafunctional imine compositions. In particular, this invention relates to diethylenimino and dipropyleniminophosphate esters of diethylene glycol.

The object of this invention is to provide novel tetrafunctional imine cure agents for the curing of polymeric materials containing a plurality of reactive carboxyl groups.

The novel compositions of the present invention have the structure

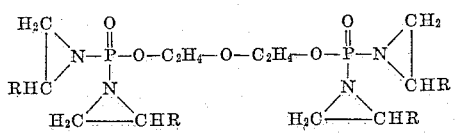

wherein the R's may be the same or different and may be H or $CH_3$.

The novel curing agents of this invention are prepared by esterification of diethylene glycol with phosphorous oxychloride and then by further reaction of the ester thus formed with ethylene and/or propylene imine, as in Equations 1 and 2 respectively.

EQUATION 1.—ESTERIFICATION $$HO-C_2H_4-O-C_2H_4-OH + 2POCl_3 \longrightarrow$$

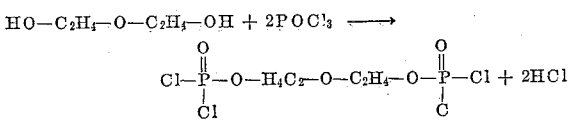

EQUATION 2.—IMINE ADDITION

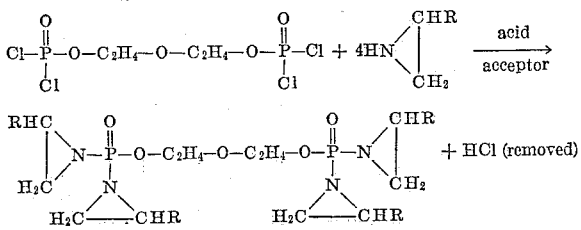

The esterification (Equation 1) reaction is highly exothermic in nature, and is carried out by a slow addition of quantities of diethylene glycol to phosphorous oxychloride in dropwise fashion over lengthy periods of time. During this reaction hydrogen chloride is formed and it is permitted to escape to the atmosphere. The reaction is allowed to proceed with stirring within a controlled temperature range of from 50 to 90° C., and preferably at 60 to 70° C. The tetrachlorophosphate esters produced are water sensitive, clear amber liquids of about 1 to 2 poise in viscosity at 80° F. and they are of such a high degree of purity that they may be used as so produced.

The imine addition reaction (Equation 2) results in replacing each of the four reactive chlorine atoms of the ester with

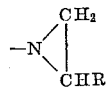

groups to produce the novel curing agents of the present invention and hydrogen chloride as a by-product. The presence of hydrogen chloride in the product mixture, however, provides difficulties for it promotes an almost instantaneous self-polymerization of the curing agents, and thus a concurrent loss in their ability to cure carboxyl-containing polymers. The removal of the hydrogen chloride as seen as it is formed, therefore, is desirable and may be effected by the use of an "acid acceptor," usually a basic substance, which immediately reacts with and "ties up" both the hydrogen chloride formed and any other acid values which may be present.

In practice, the imine, ethylene or propylene imine, is dissolved or dispersed in a liquid vehicle containing a suitable acid acceptor. Pyridine, for example, may be used both as the solvent vehicle and acid acceptor, or another organic such as triethylamine dissolved in benzene may also be used but such organic bases provide unusually difficult problems in cure product isolation. Another and preferred method used is to dissolve or disperse the imine in an aqueous medium containing potassium or sodium carbonate as the acid acceptor. The tetrachlorophosphate is usually dissolved in an inert organic solvent vehicle such as toluene or benzene, and then is added dropwise, at low temperatures and with strong agitation to the water-imine-$K_2CO_3$ mixture over a 1 to 4 hour period. Temperature control is closely maintained between 0 to +20° C., during this period.

Isolation of the tetra-imine curing agents from the reaction product mixture is accomplished by separating the aqueous layer from the organic layer by decantation or use of a separatory funnel. The organic solvent is removed from the organic layer by vacuum stripping, leaving the curing agent products as the pot residue.

The novel curing agents of the present invention are oily liquids, having a viscosity between 1 and 6 poises at 80° F. They are tetrafunctional, having four reactive imine sites per molecular unit, each of which is capable of reacting with the active hydrogen of a carboxyl radical on a polymer molecule to produce ring opening and recombination reactions as shown in Equation 3. To form cured, polymeric networks where a polymer has a plurality, that is about 2 or more reactive carboxyl sites per molecule, cure of the polymer with the curing agents will occur upon heat treatment of the cure system by several coupling reactions such as by chain extension, that is, linking one end of one polymer molecule of that of another, by crosslinking, that is, joining two or more polymer molecules through reaction sites pendant to the molecular backbones by the relatively short lengthed curing agent molecules, and by the bunching effect of ring formation reactions which occurs when two or more imine sites on a particular curing agent molecule react with two or more carboxyl sites on the same polymer molecule. Also, because of the high degree of functionality of the curing agents of the present invention, many combinations of chain extension, crosslinking and ring formation reactions are possible for any specific curing agent polycarboxylic polymer cure system.

EQUATION 3

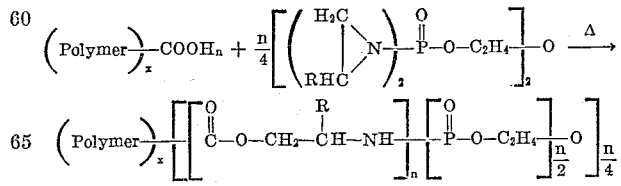

in which $x$ is the number of polymer chains being cured and $n$ is the number of carboxyl groups on the polymer chains that are reacted with the curing agent.

Liquid and solid polymers which have sufficient reactive carboxyl groups to impart at least 0.05 acid equivalent weights to each 100 g. of uncured polymer, and possessing at least about 2 reactive carboxyl sites per molecule may be cured with the novel curing agents of the present invention. Where carboxyl equivalents are less than 0.05, some degree of cure may be obtained upon heat treatment of the cure system, however, the cure products so produced do not show good elastomeric properties. Where less than about 2 reactive carboxyl sites are present per molecule, the repetitive chain extension, crosslinking and ring forming reactions necessary for good cure do not usually occur. The products so produced would not provide the desired elastomeric properties due to lack of crosslinking, etc.

Use of the curing agents of the present invention in concentration ratios of about 1.5 equivalent weights of tetrafunctional imine for each equivalent weight of the polycarboxyl containing polymer employed is recommended to insure an adequate cure. Also, intimate mixing of uncured polymer and the curing agent has been found necessary to provide good cure. The latter may be accomplished by milling, as with several passes on a three roller paint mill.

Heat treatment of the cure systems may also be needed to provide a resilient cure product. This may be effected by heating the systems within the range of 80 to 225° F., the preferred temperature of cure being dictated by the nature of the specific polymer system, the quantity of acid equivalent values present in the uncured polymer, and also by the speed of cure desired. For copolymers of butadiene and acrylic acid, and copolymers of isoprene and methacrylic acid which have carboxyl equivalent values of about 0.06/100 g. copolymer, the favored cure conditions were found to be at about 170° F. for about 24 hours to obtain the desired elastomeric properties. Other polycarboxyl containing polymers may be cured using the curing agents of the present invention and include such copolymers as that of butadiene and methacrylic acid, isoprene and acrylic acid, vinylidene chloride and acrylic or methacrylic acid, vinyl chloride and monoalkylmaleate, etc.

The following examples are illustrative of the present invention and are not intended as a limitation upon the scope thereof.

*Example 1*

Fifty-three grams (0.5 mole) of diethylene glycol were added dropwise with stirring to 339 g. (2 moles) of phosphorous oxychloride in a glass reactor open to the atmosphere by means of a dropping funnel over a 15 minute period. The temperature was maintained at 60 to 70° C. during addition, and also for an additional 2 hours at the end of which time the pot contents were cooled to ambient. One hundred sixty-six grams of a viscous liquid pot product having a chlorine content of 38.56% by weight were collected, and this was used as is as the tetrachlorophosphate ester. Eighty-five and one-half grams (1.5 moles) of propylene imine and 207 g. of potassium carbonate were slowly added with stirring to 250 ml. of water in a 1-liter 3-necked reaction vessel over 10 minutes at temperatures of 10 to 20° C.

One-hundred sixty-two grams (0.3 mole) of the tetrachlorophosphate ester produced above were dissolved in 250 ml. of benzene and then added dropwise with stirring to the aqueous propylene imine/$K_2CO_3$ system over a 1½ hour period at temperatures of 10 to 20° C. The reaction mixture was stirred for an additional 1½ hours and then was permitted to come to room temperature. The pot contents were transferred to a separatory funnel, and the denser aqueous phase was removed and discarded. The organic mixture was transferred to a vacuum flask and stripped of benzene at ca. 15 mm. Hg over a 16 hour period. The remaining product was heavily laden with solids, which were removed through vacuum filtration. The filtered product, diethylene glycol bis(dipropylenimino)phosphine oxide, was a light yellow, clear liquid having a viscosity of about 2 poises, a nitrogen content of about 13.08% (theoretical, 13.03%), and a phosphorous content of 15.28% (theoretical, 14.7%). The product was then suitable for use as is.

Diethylene glycol bis(diethylenimino)phosphine oxide may be obtained by the same procedure by using ethylene imine instead of propylene imine as shown above.

*Example 2*

Nine and one-tenth grams of diethylene glycol bis(dipropylenimino)phosphine oxide, prepared as in Example 1, were intimately mixed on a 3-roller paint mill with 100 g. of a liquid copolymer of butadiene and acrylic acid having a carboxyl equivalent content of about 0.06. The cure mixture was poured into an aluminum cup and permitted to cure at 170° F. Within 3 hours the cure mixture had set up to a gel, and at the end of 22 hours a soft (about 15 to 20 Shore "A" durometer degrees) rubbery solid was obtained.

We claim:
1. A compound having the formula

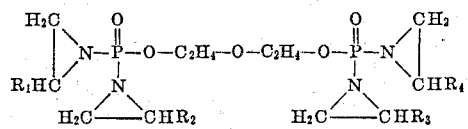

in which $R_1$, $R_2$, $R_3$ and $R_4$ are selected from the group consisting of H and $CH_3$.
2. A compound as in claim 1 in which $R_1$, $R_2$, $R_3$ and $R_4$ are $CH_3$.

References Cited by the Examiner

Japanese application 36/3,579, April 1961.
Chemical Abstracts, vol. 58, page 10172b (1963).
Petrov et al.: Chemical Abstracts, vol. 55 (1961), page 18695; abstracting Zhur. Obschei Khim., vol. 30, pp. 2863–8 (1960).

HENRY R. JILES, *Acting Primary Examiner.*

IRVING MARCUS, *Examiner.*

J. T. MILLER, ALTON D. ROLLINS,
*Assistant Examiners.*